US010242699B1

(12) United States Patent
Ebadian et al.

(10) Patent No.: US 10,242,699 B1
(45) Date of Patent: Mar. 26, 2019

(54) SINGLE PULSE DEGAUSSING DEVICE WITH ROTARY ACTUATED CHAMBER ACCESS DOORS (71) Applicant: Phiston Technologies, Inc., Miami, FL (US)

(72) Inventors: M. Ali Ebadian, Miami, FL (US); Raul Travieso, Miami, FL (US)

(73) Assignee: Phiston Technologies, Inc., Miami, FL (US)

( * ) Notice: Subject to any disclaimer, the term of this patent is extended or adjusted under 35 U.S.C. 154(b) by 0 days.

(21) Appl. No.: 15/987,453

(22) Filed: May 23, 2018

(51) Int. Cl.
*G11B 5/024* (2006.01)
*H01F 27/28* (2006.01)

(52) U.S. Cl.
CPC .......... *G11B 5/0245* (2013.01); *H01F 27/28* (2013.01)

(58) Field of Classification Search
CPC .. G11B 2005/0018; G11B 2020/10851; G11B 5/012; G11B 5/024; G11B 5/0245; G11B 5/03; G11B 5/10; G11B 5/265; G11B 5/325; G11B 5/02; G11B 23/282; G11B 5/00; G11B 5/016; G11B 5/127; G11B 5/825; G11C 11/1673; G11C 11/2273; G11C 11/4091; H01F 13/00; H01F 13/006; H01F 27/28; H01F 7/1877; H01H 47/00; H01H 47/22; H01H 50/02; G04D 9/00; G09F 9/375; H03K 3/57; Y10T 307/484
USPC .......... 361/142, 143, 149; 360/66, 118, 129; 365/209
See application file for complete search history.

(56) References Cited

U.S. PATENT DOCUMENTS

| | | | |
|---|---|---|---|
| 2,838,720 A | 6/1958 | Dostal |
| 2,962,560 A | 11/1960 | Folse |
| 3,321,586 A | 5/1967 | Krones |
| 4,157,581 A | 6/1979 | Keiichi et al. |
| 4,286,295 A | 8/1981 | Ipolyi |
| 4,423,460 A | 12/1983 | Jackson et al. |
| 4,551,782 A | 11/1985 | Seely et al. |
| 4,621,299 A | 11/1986 | Hill |
| 4,639,821 A | 1/1987 | Littwin et al. |
| 4,757,419 A | 7/1988 | Masaki |
| 5,132,860 A | 7/1992 | Von Stein |
| 5,198,959 A | 3/1993 | Scholtysik et al. |
| 5,666,413 A | 9/1997 | Kempf |
| 5,691,873 A | 11/1997 | Masaki |
| 5,721,665 A | 2/1998 | Schultz |

(Continued)

OTHER PUBLICATIONS

(Proton Data Security [online]. machine-solution.com [retrieved on Aug. 1, 2017]. Retrieved from the Internet: <URL: https://www.machine-solution.com/Shared/Brochures/Proton-T-4-W1-Degausser-Brochure.pdf>. (Year: 2017).*

*Primary Examiner* — Thienvu V Tran
*Assistant Examiner* — Nicolas Bellido
(74) *Attorney, Agent, or Firm* — McHale & Slavin, P.A.

(57) ABSTRACT

A single magnetic pulse degaussing apparatus for use in erasing information contained on magnetic recording or storage media. A degaussing chamber for receipt of magnetic forces above 2.0 Tesla is accessible by upper and lower rotary actuated doors. The internal flux of a coil is measured by the current passing through the coil during the discharge cycle to provide a flux versus time measurements. The measurements are inserted into a performance verification algorithm to assure sufficient time for media destruction has taken place before releasing the media from the degaussing chamber.

9 Claims, 6 Drawing Sheets

(56) References Cited

U.S. PATENT DOCUMENTS

| | | | |
|---|---|---|---|
| 5,979,774 | A | 11/1999 | Urushibata |
| 6,714,398 | B2 | 3/2004 | Schultz |
| 7,324,321 | B2 | 1/2008 | Olliges |
| 7,652,837 | B2 * | 1/2010 | Kitamura ............... G11B 5/012 |
| | | | 360/66 |
| 8,064,183 | B2 | 11/2011 | Olliges |
| 2005/0041319 | A1 * | 2/2005 | Hasegawa ............ G11B 5/0245 |
| | | | 360/66 |
| 2006/0018075 | A1 * | 1/2006 | Schultz ................ G11B 5/0245 |
| | | | 361/143 |
| 2007/0247776 | A1 * | 10/2007 | Tamura ................ G11B 5/0245 |
| | | | 361/149 |
| 2010/0276524 | A1 * | 11/2010 | Ebadian ................. B02C 1/005 |
| | | | 241/27 |
| 2010/0294865 | A1 * | 11/2010 | Wozny ................ G11B 23/505 |
| | | | 241/25 |

\* cited by examiner

FIG. 7

SINGLE PULSE DEGAUSSING DEVICE WITH ROTARY ACTUATED CHAMBER ACCESS DOORS

FIELD OF INVENTION

The invention relates to magnetic recording media erasers and, in particular, to a capacitor based degaussing apparatus with internal flux monitoring.

BACKGROUND OF THE INVENTION

Electronic storage of media is a preferred method of storing digital information. Reliance upon magnetic storage mediums for storing all types of information is increasing exponentially. Confidential information stored on such media storage devices is secure as long as the magnetism of the storage medium is protected. Should the storage medium be discarded, the media could be read by an unauthorized person. Thus, the need to erase information from storage medium to be discarded is of paramount importance.

There are various devices employed to erase the information stored on hard drives, but the most conventional is by degaussing to obtain reliable and complete erasure of the information contained on the hard drive. Unfortunately, the finding of discarded electronic storage media still containing data is now common news. People believed the data had been deleted when a data storage device had been degaussed.

Hard disc drives typically include magnetic coatings rising past hard coercivities of 3000 Oersteds. The prior art systems using permanent magnets may not address the problems associated with degaussing of the newer type of hard drive components that are not readily accessible, due to such factors as the sealing of the hard drive disk and/or head within an enclosure having high coercivity magnetic media.

In many instances, the act of degaussing must address the more difficult to reach hard disc media and/or remove signal data plus any residual magnetic noise if the disc is to be reused. The use of a capacitive discharge has been found to reach the more difficult hard disc drives and address extraneous or structurally generated magnetic noise pulses that might remain in the magnetic coating.

A number of prior art devices for mechanical media destruction as well as media destruction by degaussing are embodied in patents such as U.S. Pat. Nos. 2,838,720; 2,962,560; 3,321,586; 4,157,581; 4,286,295; 4,423,460; 4,551,782; 4,621,299; 4,639,821; 4,757,419; 5,132,860; 5,198,959; 5,666,413; 5,691,873; 5,721,665; 5,979,774; 6,714,398; 7,324,321 and 8,064,183.

What is lacking in the art is a single magnetic pulse degaussing apparatus that can fit into a 19-inch rack frame having a chamber wherein coil flux is monitored during the discharge cycle and rotary actuated chamber access doors are used for accessing the chamber.

SUMMARY Of INVENTION

Disclosed is a single magnetic pulse degaussing apparatus for use in erasing information contained on magnetic recording or storage media. The apparatus employs a chamber accessible by rotary actuated doors. The chamber utilizes a coil with a known (measured) current to flux relationship. The internal flux can be measured indirectly by measuring the current passing through the coil during the discharge cycle. Monitoring of the current is used to measure the flux versus time profile. The measurements are inserted into a performance verification algorithm to assure sufficient time for media destruction has taken place. Operational data can be displayed on a user screen or saved to a file as a record of the flux vs. time profile experienced by the device being degaussed. The degaussing device constructed and arranged to fit into a 19-inch rack mount frame.

An objective of the invention is to provide a nearly silent degaussing apparatus capable of irrevocably rendering information stored on magnetic memory inaccessible in a single magnetic pulse.

Another objective of the invention is to measure the flux versus time profile using a performance verification algorithm to assure sufficient flux for sufficient time has been applied to a device being degaussed.

Still another objective of the invention is to provide a magnetic chamber sealed by rotary actuated plates.

Still another objective of the invention is to provide a single magnetic pulse degaussing device constructed and arranged to fit into a 19-inch rack mount frame.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE INVENTION

While the present invention is susceptible of embodiment in various forms, there is shown in the drawings and will hereinafter be described the presently preferred embodiment with the understanding that the present disclosure is to be considered an exemplification of the invention, and is not intended to limit the invention to the specific embodiments illustrated.

Figure 1:
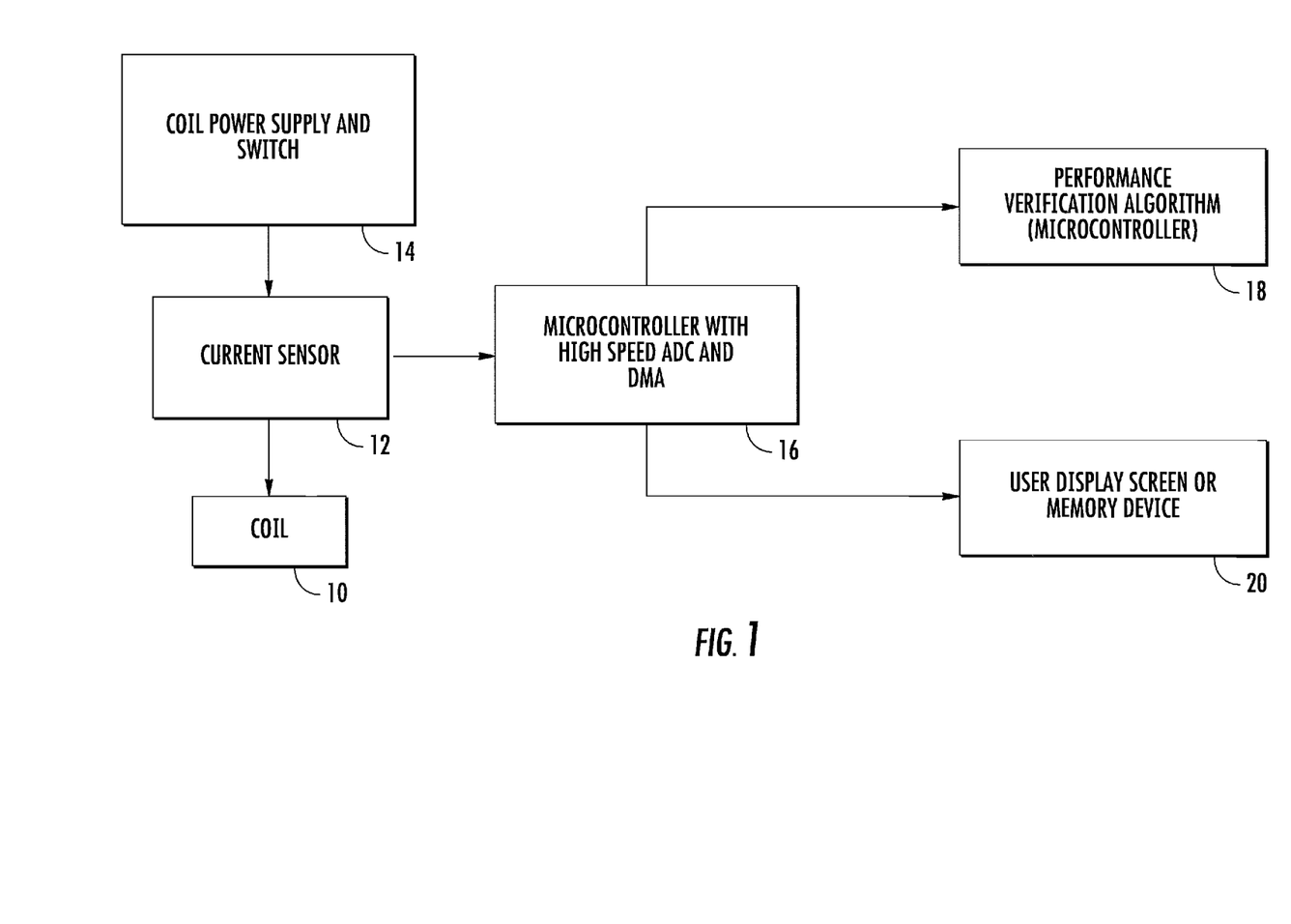
FIG. 1 is a flow diagram of the degaussing apparatus.

Referring to FIG. 1, illustrated is a coil 10 which has a known (measured) current to flux relationship. Internal flux of the coil 10 can be measured indirectly by a sensor 12 measuring the current passing through the coil during the discharge cycle. The coil is wound around opening to an interior chamber with power supplied to the coil 10 through a coil power supply 14. Continuous monitoring of the current by a microcontroller 16 can be used to measure the flux versus time profile. This information can be fed into a performance verification algorithm 18 to assure sufficient flux for sufficient time has been applied to the device being degaussed. The information can be displayed on a user screen or saved to a memory device 20 as a record of the flux vs. time profile experienced by the device being degaussed. The microcontroller has high speed ADC (analog to digital converter) and DMA (direct memory access), wherein the microcontroller is arranged to determine performance by a verification algorithm.

Figure 2:
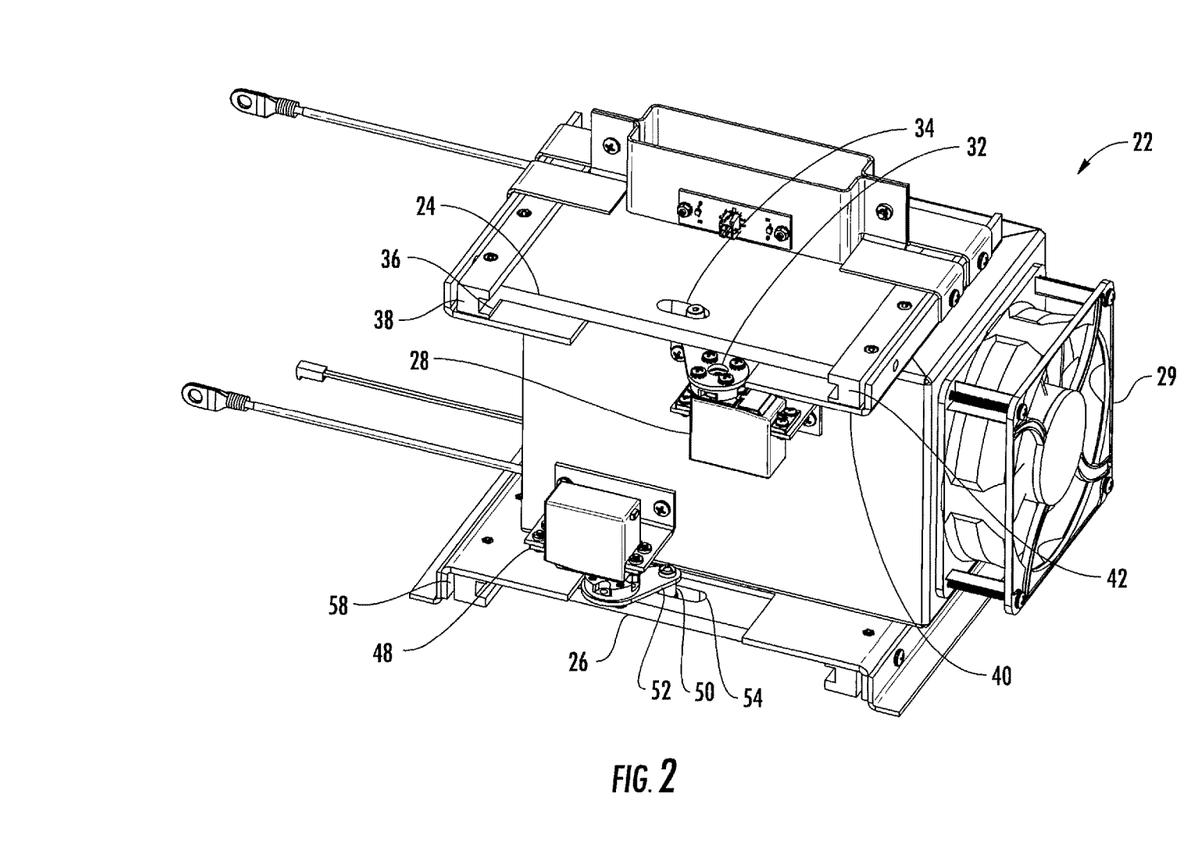
FIG. 2 is a perspective view of the chamber with plates in a sealed position.
Figure 4:
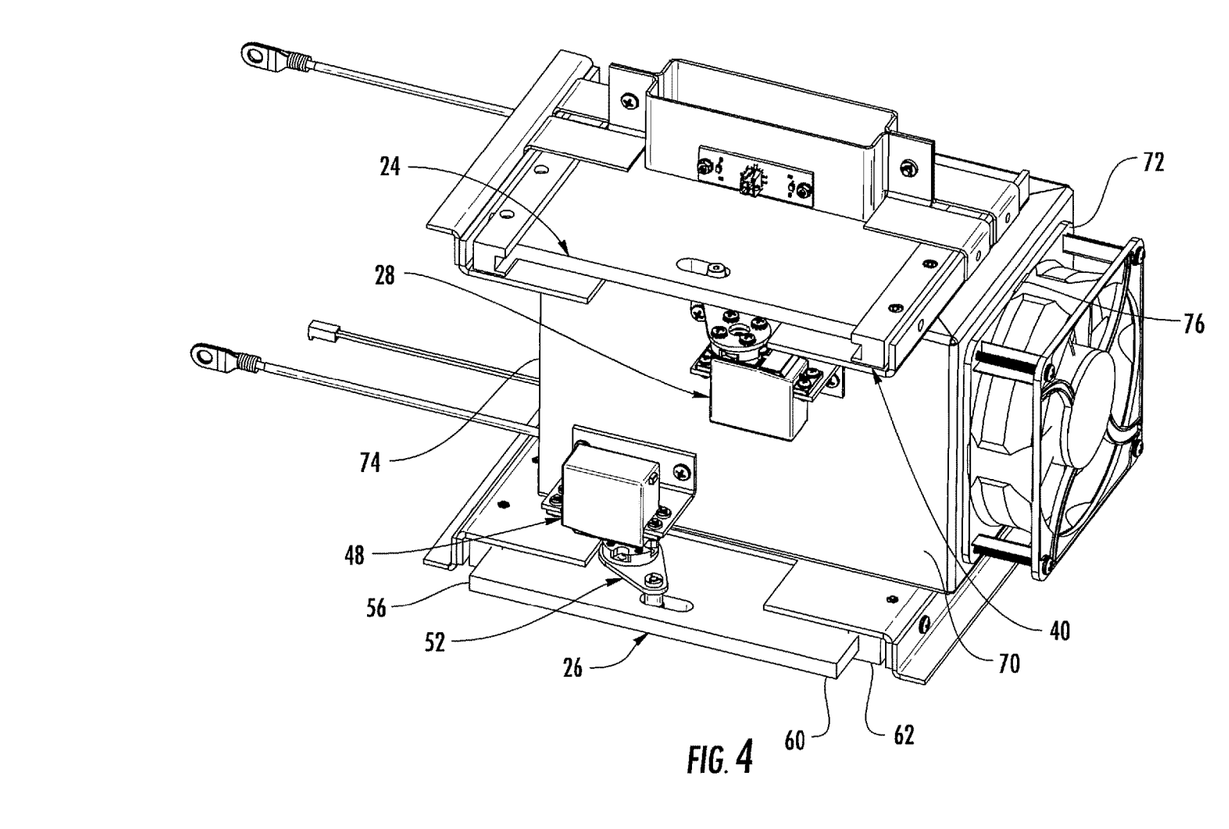
FIG. 4 is a perspective view of the chamber with a bottom plate in an open position.

During a degauss operation, a magnetic chamber housing 22 having an interior chamber is sealed on either end by steel plates 24, 26 providing a shielded chamber. These plates perform a twofold function. A first function during the degauss operation wherein they provide a low reluctance flux path across the top of a coil 29 within the chamber, which is helpful in evenly distributing the flux field internally in the coil throat. A second function takes place during the load and eject cycles, the plates 24, 26 control the entry and exit of a device being degaussed. This is accomplished by the top steel plate or "gate" 24 being opened first, allowing material to be degaussed to enter the chamber. The top gate 24 is then closed, sealing the chamber both mechanically and providing magnetically shielded cover. The material is then degaussed with a magnetic pulse, and the lower gate 26 is opened, allowing the degaussed material to exit. The top gate 24 is opened by a rotary actuator 28 using a follower 30 on the end of a cam arm 32. The follower 30 is formed from a ball bearing sleeve constructed and arranged to reside within a slot 34 formed in the top gate. Movement of the top gate 24 causes side edge 36 to slide along C-shaped bracket 38, and side edge 40 slides along C-shaped bracket 42. Movement of the cam arm 32 causes the top gate 24 to move over the rotary actuator 28 to allow an opening to the chamber within the housing 22. The bottom gate 26 is opened by a rotary actuator 48, which operates in a similar manner as the rotary actuator 28 for the top gate 24. The bottom gate 26 uses a follower 50 on the end of an arm 52. The follower 50 is formed by a ball bearing sleeve and is constructed and arranges to reside within slot 54 formed in the bottom gate 26. Movement of the bottom gate 26 is results in side edge 56 sliding in C-shaped bracket 58, and side edge 60 sliding in C-shaped bracket 62. Movement of the arm 52 causes the bottom gate 26 to move over the rotary actuator 48 to allow an opening to the chamber within the housing 22.

Figure 3:
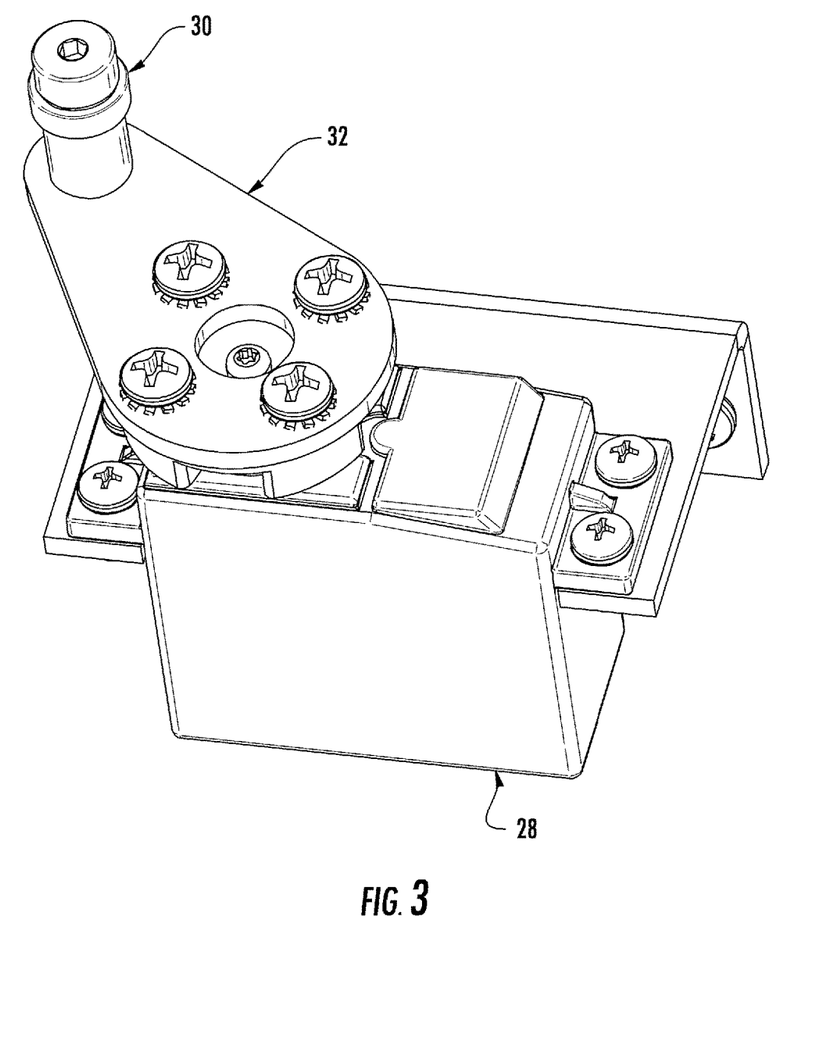
FIG. 3 is a perspective view of the rotary actuator.

FIG. 3 depicts the rotary actuators 28, 48. It is noted that rotary actuator 48, used on the bottom plate, is interchangeable with the rotary actuator 28 used on the top plate. The rotary action is translated into a linear motion using the cam arm 32 with a ball bearing follower 30 on the end of the cam arm 32. The ball bearing follower 30 resides inside the slot 34 in the gate 24. Thus, by commanding the rotary actuator 28 to rotate in the appropriate direction, the gate 24 can be opened or closed. FIG. 2 depicts the device with both gates 24, 26 closed. FIG. 4 shows the device with the bottom gate 26 open and the top gate 24 closed. Since standard rotary actuators 28, 48 can be commanded to certain positions by varying the position command at a given rate, the velocity of the gate movement, as well as the position of the gate, can be controlled. The rate of the position command change sent to the rotary actuator from the micro controller.

To protect a user from injury when the gates 24, 26 are closing, the force of the actuators 28, 48 can be regulated. Since the rotary actuator torque is proportional to the current in the actuator, and since the torque is translated to force through the "cam follower", the current to the rotary actuator can be limited, and thereby the force acting on the gates will also be limited. Limiting the current to the actuator can be accomplished in many ways. Current can be limited with a series resistor or with an active current limiting circuit. Many such current limiting circuits are known to those skilled in the art.

To decrease the total time required for a degauss cycle, the high voltage capacitor bank must be charged at a faster rate (higher current). However, the stock magnetic components available to work with a high voltage capacitor charger IC are limited in their power capability. To obtain increased charge currents and decreased charge times using standard magnetics and parts, the charging circuits can be paralleled. The supervising microcontroller can monitor each charging circuit to make sure they operate in proper synchronicity.

The coil based degaussing apparatus comprises a housing having a front wall 70, a back wall 72, and two opposing side walls 74, 76 for defining an interior chamber therebetween. The interior chamber having an upper opening and a lower opening. The coil is coil wound around an opening to the interior chamber having a capacitor charge to provide a single magnetic pulse degaussing current to said interior chamber, which is capable of magnetic forces greater than about 2.0 Tesla. The housing is partially shielded to cause the magnetic forces to be directed into said interior chamber. In the preferred embodiment, the capacitor is an energy storage bank consisting of multiple paralleled electrolytic capacitors. These capacitors are known to fatigue over time, causing their capacitance to decrease and their internal impedance to increase, both reducing the effectiveness of the energy storage bank. By continuously monitoring and integrating the charging power and discharge power of the capacitor bank, system performance can be monitored, and devices degradation detected.

Figure 5:
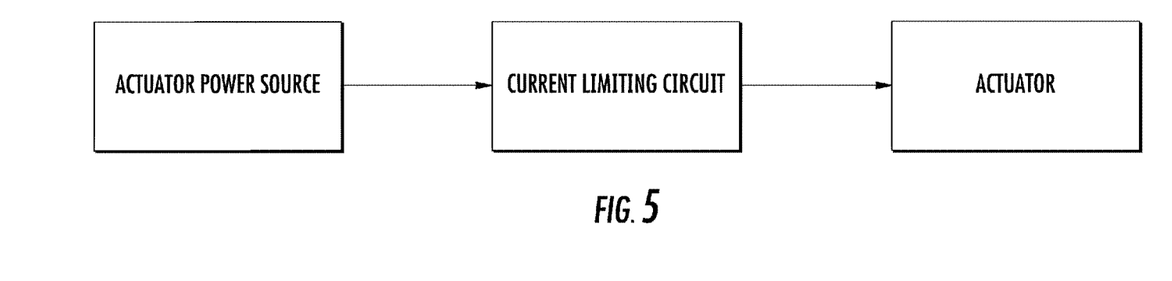
FIG. 5 is a flow diagram of the actuator power grid.
Figure 6:
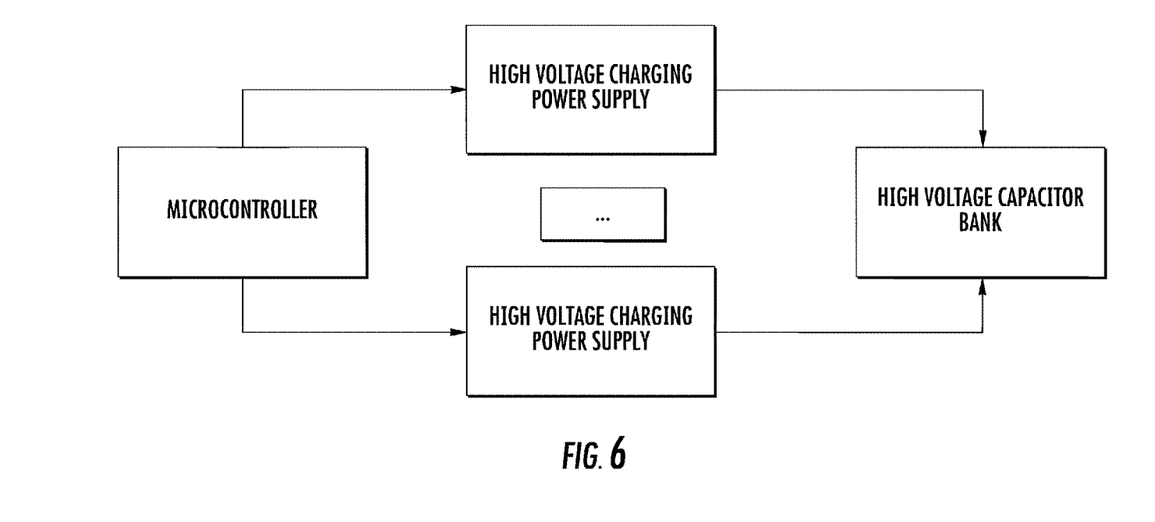
FIG. 6 is a flow diagram of the microcontroller power grid.

FIG. 5 depicts the power grid for the actuator consisting of a power source, a current limiting circuit and the actuator. FIG. 6 depicts the microcontroller grid having a first high voltage charging power supply, which consists of multiple electrolytic capacitors places in parallel with at least one other electrolytic capacitor for charging a high voltage capacitor bank.

Figure 7:
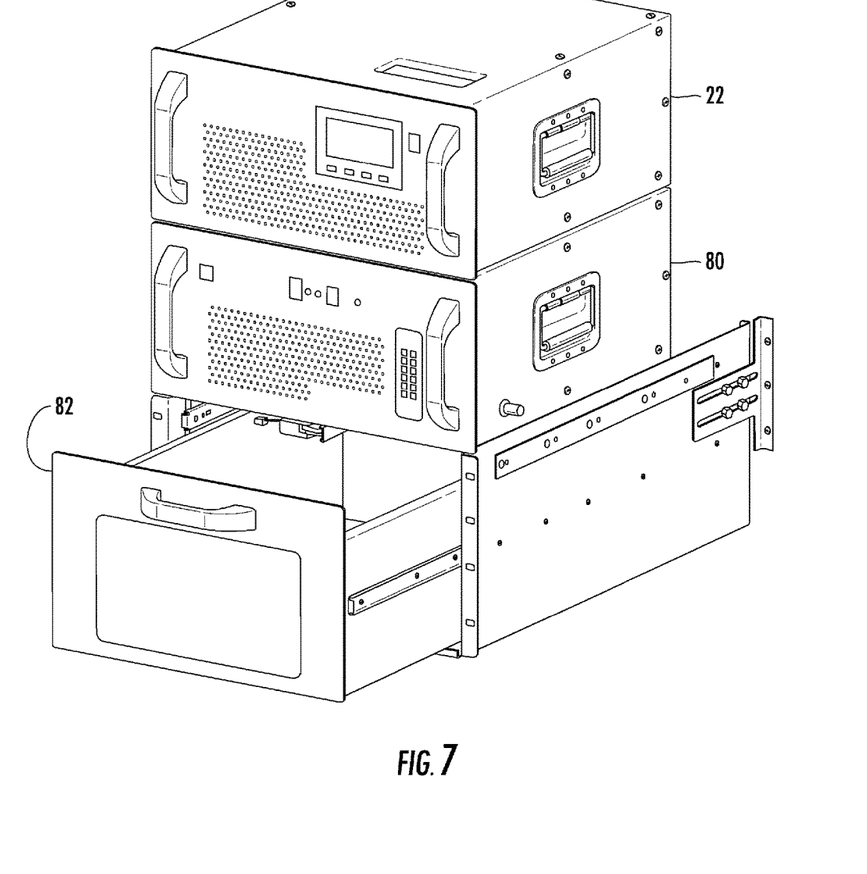
FIG. 7 is a pictorial view of a rack mount.

The chamber housing 22 fits in a standard 19" rack mount frames and can be easily mounted in standard "server" racks in data centers. This mounting architecture allows the device to be easily accessible by the users, but use less floor space. Additionally, the degausser can be mounted on a slide so that it can extend out from the rack for service. To increase the certainty of data destruction, the degausser may also be coupled to a crusher device 80. This double destruction configuration allows for further destruction of the media; an example configuration is shown in FIG. 7. In this embodiment, the top unit is the degausser 22, the middle unit is the crusher 80, and the bottom unit is the catch drawer 82. Connection to the internet allows for remote device configuration and examination. Some configuration and examinable features could include: volatile operator password; remote software and firmware updates; remote querying of system performance, system usage, and system status; and remote diagnostics. An external USB interface allows the device to interface with external peripherals such as scanners, cameras, auto-feeders, etc.

Hierarchical Password Protection is provided, wherein device information and access can be partitioned into levels according to security risks and sensitivities. Access to normal operation of the device would require an operator level password. Access to trouble shooting and diagnostic info would require a technician level password. Access to usage data and system settings would require a system administrator level password. All said passwords can be configured remotely over the internet and can be volatile (expire after set time) and person specific. Passwords would be entered locally on the degausser's touch screen.

A touch screen allows for dynamically configured screens and "control panels". These could include 1) Password entry screen for appropriate device access, 2) Full system diagnostics display (operating temperatures, performance metrics, etc.) accessible through technician level password, 3) User prompts and feedback, and 4) Configuration settings.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A single magnetic pulse degaussing device comprising:
    a housing having a front wall, a back wall, opposing side walls, a bottom gate and a upper gate forming an interior chamber,
    a coil wound around an opening to said interior chamber, said coil coupled to a capacitor to provide a single magnetic pulse degaussing current having magnetic forces approximately to 2.0 Tesla into said interior chamber for degaussing of media;
    a microcontroller having a high speed ADC (analog to digital converter) and DMA (direct memory access) electrically coupled to said coil for measuring current and determining performance of the degaussing of media by a verification algorithm;
    a first rotary actuator having a first cam arm with a bearing sleeve for engaging a slot in said bottom gate, said first rotary actuator moving said bottom gate positioned beneath a lower opening between an open position for access to said interior chamber and a closed position;
    a second rotary actuator having a second cam arm with a bearing sleeve for engaging a slot in said upper gate, said second rotary actuator moving said upper gate positioned above an upper opening between an open position for access to said interior chamber and a closed position;
    whereby media positioned within said interior chamber through said upper gate and receives a single magnetic pulse to degauss the media wherein said microcontroller analyzes the current rate to report if the media received sufficient induced magnetic field for a sufficient period of time for complete degaussing, upon verification of complete degaussing said bottom gate is opened for removal of the degaussed media.

2. The single magnetic pulse degaussing device according to claim 1 wherein each said gate is moved at a rate of velocity dependent upon the rate of the position command change sent to the rotary actuator from the microcontroller.

3. The single magnetic pulse degaussing device according to claim 1 wherein torque to each said rotary actuator is proportional to current to each said actuator.

4. The single magnetic pulse degaussing device according to claim 3 wherein the current is limited to each said actuator by a series resistor.

5. The single magnetic pulse degaussing device according to claim 3 wherein the current is limited by an active current limiting circuit.

6. The single magnetic pulse degaussing device according to claim 1 wherein said capacitor is further defined as multiple paralleled electrolytic capacitors, wherein each said capacitor is monitored for temperature and current to determine degradation.

7. The single magnetic pulse degaussing device according to claim 1 wherein said housing is constructed and arranged to fir into a 19-inch rack mount frame.

8. The single magnetic pulse degaussing device according to claim 1 wherein said microcontroller is coupled to the internet to allow for remote configuration and examination of said device.

9. The single magnetic pulse degaussing device according to claim 8 wherein said examination includes remote querying of system performance, system usage, and system status.

* * * * *